W. A. LEWIS.
Churn-Powers.
No. 136,925. Patented March 18, 1873.
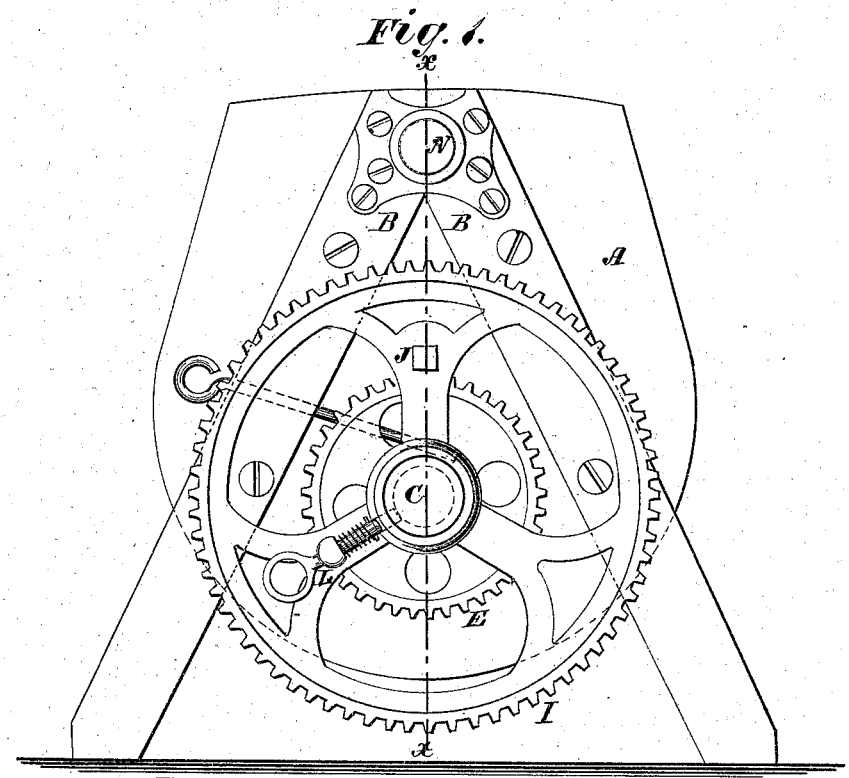
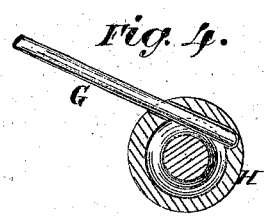
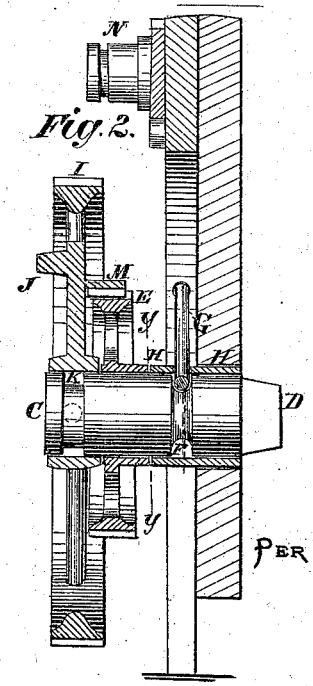
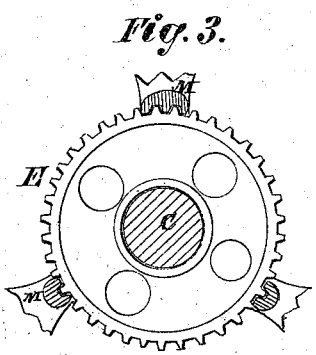
Witnesses:
F. McArdle
C. Sedgwick
Inventor:
W. A. Lewis
per [signature]
Attorneys.

UNITED STATES PATENT OFFICE.

WILLIAM A. LEWIS, OF SPRINGFIELD, VERMONT.

IMPROVEMENT IN CHURN-POWERS.

Specification forming part of Letters Patent No. 136,925, dated March 18, 1873.

*To all whom it may concern:*

Be it known that I, WILLIAM A. LEWIS, of Springfield, in the county of Windsor and State of Vermont, have invented a new and useful Improvement in Churn-Power, of which the following is a specification:

The object of this invention is to improve the apparatus employed in rotating the dashers of churns; and consists, first, of a clutch by which two gear-wheels are fastened so as to revolve together. It also consists in the mode of confining the wheels to the arbor, and in the general arrangement of parts hereinafter more fully described and set forth.

In the drawing, Figure 1 represents an end view, showing the gear-wheels and the manner of their arrangement when a slow motion is required. Fig. 2 is a vertical section of Fig. 1, taken on the line $x\,x$. Fig. 3 is a section on the line $y\,y$ of Fig. 2, looking to the left. Fig. 4 is a detail, showing the groove and pin for fastening the main arbor to the box.

Similar letters of reference indicate corresponding parts.

A represents the end of the churn. B is the stand attached rigidly to the end A, and forming two of the legs of the churn. C is the main arbor, which drives the dasher, the shaft of the latter being connected by means of a socket in its end to the square projection D of the arbor. E is a wheel which is cast on or rigidly attached to the arbor C. F is a circular groove in the arbor, and G is a pin, by means of which the arbor is fastened in the box H, and allowed to freely turn. I is a gear-wheel to which the power is applied by means of a handle attached to the lug J. K is a groove near the outer end of the arbor, and L is a spring by means of which this large gear is fastened to the arbor.

When the wheels are arranged as seen in the drawing, they are connected together by the clutch M. This clutch is a projection cast upon one of the arms of the wheel I. It has one or more cogs, which enter between the cogs of the wheel E, as seen in Fig. 2, so that the power of the crank is applied directly to the small wheel E. By this arrangement no strain is brought upon the pin L, that pin and groove being simply to hold the wheel in position on the arbor. The groove F and pin G are for fastening the arbor to the box H. This box is a flanged tube, fastened to the outside of the churn end with screws.

In operating the churn with the wheels arranged as seen in the drawing, the gear-wheels as such are of no use, as the motion of the dasher is just equal to that of the crank, and the large gear-wheel is a simple crank-wheel; but when it is desired to give the dasher a more rapid motion, the wheel I is detached from the arbor and placed upon the stud N, which enables the two wheels to mesh together and increase the motion of the dasher.

The clutch M may be upon the pinion or smaller wheel, and engage with the arm of the larger wheel, or a part may be upon each wheel, and lock together in any manner, so as to connect the wheels. When the wheel I is changed to multiply the motion, it is held to the stud N by a groove and the pin L, as when on the arbor.

In fastening the arbor to the box H, the pin G passes through one of the legs B, so that it can be readily withdrawn for detaching the arbor. The groove F for this pin is made round or circular at its bottom, so as to fit the pin, and consequently give a greater bearing-surface than the ordinary square groove would afford.

Having thus described my invention, I claim as new and desire to secure by Letters Patent—

1. The clutch M, or its equivalent, in combination with the gear-wheels, when the said wheels are employed as and for the purposes described.

2. The groove F, as and for the purposes described.

3. The combination and arrangement of the changeable wheels E and I, arbor C, stud N, clutch M, grooves F and K, and pins G and L, as and for the purposes described.

WILLIAM A. LEWIS.

Witnesses:
GEORGE KIMBALL,
JOHN R. HALL.